US006692253B2

(12) United States Patent
Brockway et al.

(10) Patent No.: US 6,692,253 B2
(45) Date of Patent: Feb. 17, 2004

(54) INSTRUMENT DELIVERY HEAD

(75) Inventors: Charles Brockway, Greenville, OH (US); Jeffrey Lyn Robbins, Greenville, OH (US)

(73) Assignee: Midmark Corporation, Versailles, OH (US)

(*) Notice: Subject to any disclaimer, the term of this patent is extended or adjusted under 35 U.S.C. 154(b) by 162 days.

(21) Appl. No.: 09/976,385

(22) Filed: Oct. 12, 2001

(65) Prior Publication Data

US 2003/0073053 A1 Apr. 17, 2003

(51) Int. Cl.[7] ........ A61C 15/00
(52) U.S. Cl. ........ 433/77; 312/209
(58) Field of Search ........ 433/28, 77, 78, 433/79, 98, 108; 312/209

(56) References Cited

U.S. PATENT DOCUMENTS

| | | | | |
|---|---|---|---|---|
| 3,280,458 A | * 10/1966 | Deeley, Jr. et al. | ........ | 433/78 |
| 3,524,256 A | * 8/1970 | Barker | ........ | 433/78 |
| 4,571,182 A | * 2/1986 | Beier et al. | ........ | 433/79 |
| 4,952,146 A | * 8/1990 | Doty | ........ | 433/77 |
| 5,211,558 A | * 5/1993 | Bailey et al. | ........ | 433/77 |
| 5,655,905 A | * 8/1997 | Jaimes et al. | ........ | 433/77 |
| 5,823,773 A | * 10/1998 | Brysch | ........ | 433/77 |
| 6,152,735 A | * 11/2000 | Meyer | ........ | 433/108 |

FOREIGN PATENT DOCUMENTS

| | | | |
|---|---|---|---|
| EP | 0094470 | * 11/1983 | ........ 433/77 |

OTHER PUBLICATIONS

Midmark Corporation, *Carts*, Knight by Midmark, 1995 (4 pages).

Midmark Corporation, *Classic Operatories*, Knight by Midmark, 2000 (10 pages).

* cited by examiner

*Primary Examiner*—Cary E. O'Connor
(74) *Attorney, Agent, or Firm*—Wood, Herron & Evans, LLP

(57) ABSTRACT

An instrument delivery head for supporting hand-held instruments used in dental and other medical procedures. The instrument delivery head includes base and a lid connected to the base for movement between open and closed positions. Various instrument controls are supported by the lid so that the controls are accessible when the lid is opened. After the control adjustments are made, the lid is closed to conceal the controls within the instrument delivery head.

15 Claims, 3 Drawing Sheets

INSTRUMENT DELIVERY HEAD

FIELD OF THE INVENTION

The present invention relates generally to instrument supports and, more particularly, to an instrument delivery head for supporting hand-held instruments used in dental and other medical procedures.

BACKGROUND OF THE INVENTION

Instrument delivery heads are used in dental offices to support various hand-held instruments used by a dentist or dental technician during a dental procedure. These instruments may include water and air syringes and various hand-held drill and polishing instruments used by the dentist or technician. The instrument delivery head is suspended on a movable delivery arm so that the instrument delivery head can be moved to a convenient position near a patient during the dental procedure and then moved out of the way to allow the patient to exit the dental chair when the dental procedure is finished.

The instrument delivery head typically has a base that supports various valves, fittings and tubing required for operation of the hand-held instruments which are connected to the instrument delivery head and a removable lid supported on top of the base for concealing these components within the instrument delivery head. The lid is also used to support an instrument tray or various instruments during the dental procedure. Various instrument controls are provided on the instrument delivery head that permit the dentist or technician to adjust operation of each instrument. For example, these controls may adjust water and air parameters of the instruments so that operation of the instruments can be configured according to the dentist's preference or for a particular dental procedure.

In the past, several manufacturers of instrument delivery heads have placed the instrument controls within the instrument delivery head so that the controls are only accessible after the lid has been removed from the base. To access the controls, the dentist or technician must first remove the instrument tray or instruments supported on the lid and then find space within the room to temporarily place the tray and lid while the necessary adjustments to the controls are made. This procedure is cumbersome for the dentist or technician and also increases the risk that the lid will become unsanitized after it has been temporarily removed from the base. To reduce this risk, the lid is typically disinfected before it is placed back on top of the base to support the instrument tray.

Other manufacturers of instrument delivery heads have mounted the controls on a side or front wall of the base so that the lid does not need to be removed to permit adjustment of the instrument controls. The controls are configured to require special tooling to permit user adjustment of the controls so as to avoid the risk that the controls may be accidently or unintentionally bumped or readjusted during the dental procedure. While the lid does not need to be removed to permit user access to the controls with this instrument delivery head, the special tooling required for adjustment of the controls is inconvenient to the dentist or technician. In addition, the controls are exposed to debris from the dental procedure which complicates sanitary cleaning of the instrument delivery head after each dental procedure.

Therefore, there is a need for an instrument delivery head that provides a dentist or dental technician with convenient and safe access to instrument controls of the instrument delivery head.

SUMMARY OF THE INVENTION

The present invention overcomes the foregoing and other shortcomings and drawbacks of instrument delivery heads heretofore known. While the invention will be described in connection with certain embodiments, it will be understood that the invention is not limited to these embodiments. On the contrary, the invention includes all alternatives, modifications and equivalents as may be included within the spirit and scope of the present invention.

An instrument delivery head in accordance with the principles of the present invention includes an instrument head base and an instrument head lid mounted for movement relative to the base between open and closed positions. In accordance with one aspect of the present invention, the lid is mounted to the base through a pair of concealed hinges so the lid is movable between the open and closed positions.

Instrument holders are mounted to the base and include multiple handpiece stations for releasably holding various hand-held instruments used during a dental procedure. The lid supports multiple sets of handpiece controls that permit a user to adjust operation of each instrument when the lid is opened. The user is able to close the lid after the control adjustments have been made to conceal the instrument controls within the instrument delivery head.

Movement of the lid to the open position is accomplished through a pair of lift mechanisms that are mounted to the base and operatively engage the lid. Each lift mechanism includes a lift housing and a lift body mounted to extend and retract relative to the lift housing. Each lift body is biased for extension relative to the lift housing through a compression spring so that a free end of each lift body operatively engages an inner surface of the lid.

A releasable latch mechanism is provided to retain the lid in the closed position against the bias of the lift mechanisms. In accordance with one aspect of the present invention, the latch release mechanism includes a latch mounted to the lid and a slidable latch release mounted to the base. A button actuator is supported on a side wall of the base and is connected to the latch release. To open the lid, the button actuator is manually actuated to cause the latch release to release engagement of the latch, thereby permitting the lift mechanisms to open the lid to the open position. After the necessary adjustments to the instrument controls have been made, the lid is closed by pushing down on the lid to retract the lift bodies against the bias of compression springs until the latch engages the latch release.

With the instrument delivery head of the present invention, the handpiece controls are supported within the instrument delivery head when the lid is closed so they will not be exposed to debris from the dental procedure or be accidentally or unintentionally bumped or readjusted during the dental procedure. The lid is easily opened to permit access to the controls through actuation of the latch release. After the control adjustments are made, the lid is closed to conceal the controls within the instrument delivery head. The lid is connected to the base so it does not need to be removed and stored when access to the controls is required. The controls are easily accessible when the lid is opened and trays and other items supported on top of the lid do not need to be first removed before the lid is opened.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE PREFERRED EMBODIMENTS

Figure 1:
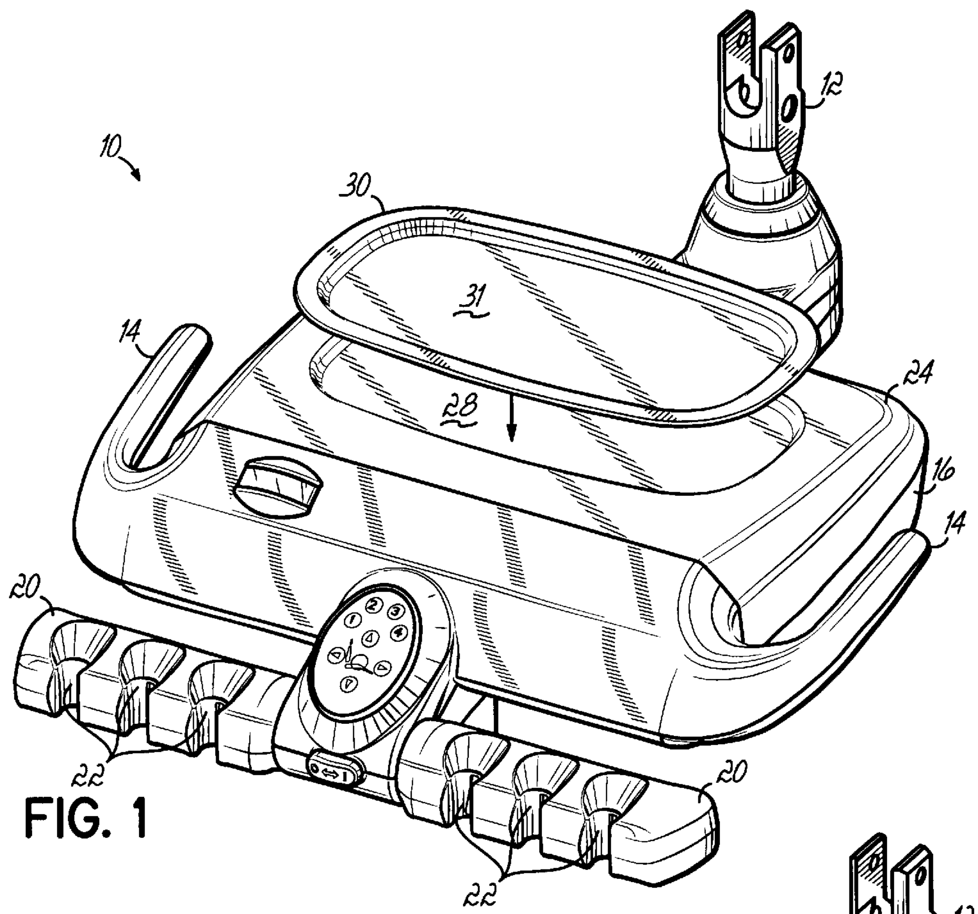
FIG. 1 is a perspective view of an instrument delivery head in accordance with the principles of the present invention, illustrating a lid of the instrument delivery head in a closed position.
Figure 2:
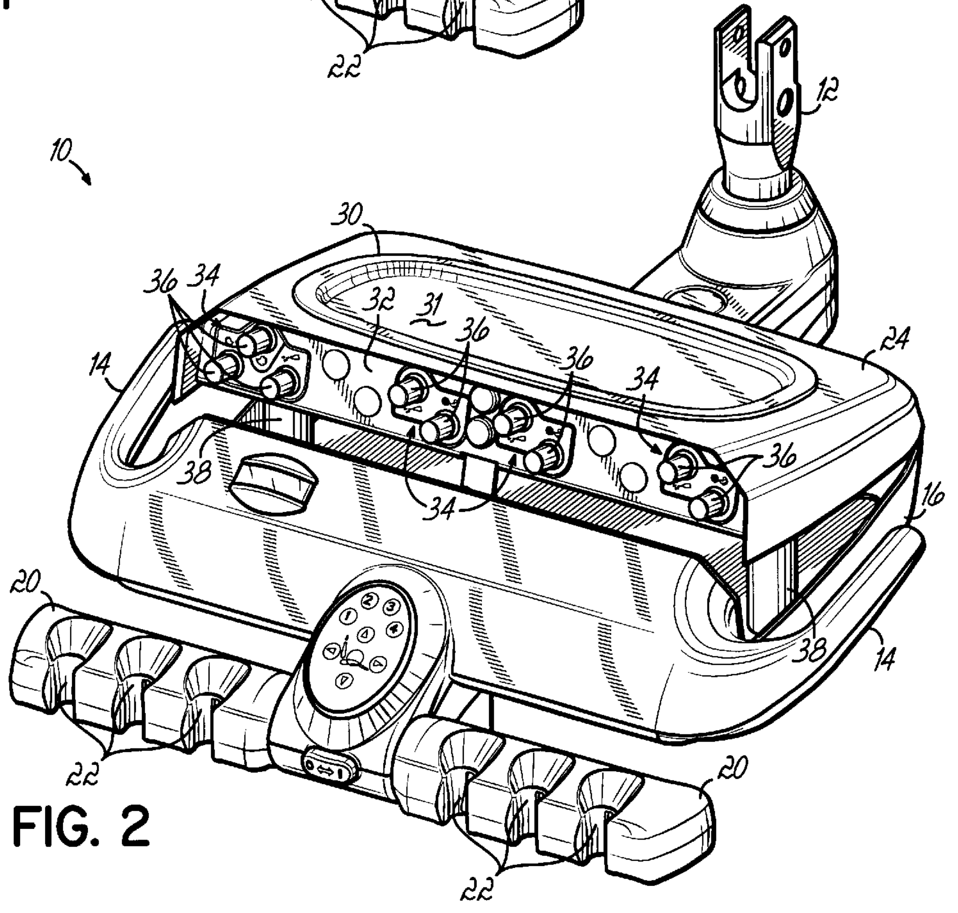
FIG. 2 is a view similar to FIG. 1, illustrating the lid of the instrument delivery head in an open position to permit user access to instrument controls.
Figure 3:
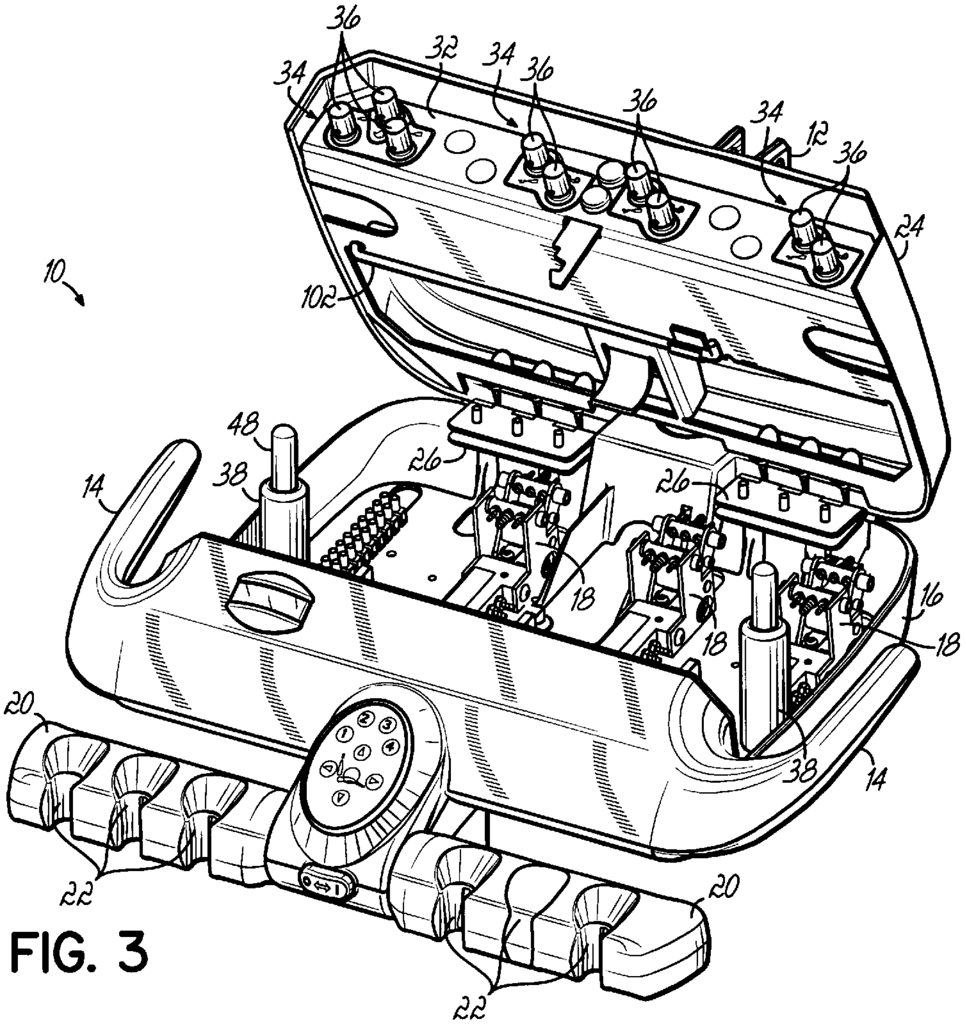
FIG. 3 is a view similar to FIG. 1, illustrating the lid of the instrument delivery head in a fully open position.

With reference to the Figures, and to FIGS. 1–3 in particular, an instrument delivery head 10 is shown in accordance with the principles of the present invention for supporting hand-held instruments or handpieces (not shown) used in dental and other medical procedures. While the instrument delivery head 10 of the present invention will be described in an exemplary embodiment herein for use in dental procedures, it will be appreciated by those of ordinary skill in the art that the instrument delivery head 10 of the present invention may be used in other medical procedures as well without departing from the spirit and scope of the present invention.

As is well known in the art, instrument delivery head 10 is mounted to a movable delivery arm (not shown) through a bearing and mount assembly 12 so that the instrument delivery head 10 is suspended by the arm for movement about three (3) axes of rotation. The instrument delivery head 10 includes a pair of handles 14 that permit a dental assistant or dentist to grasp and move the instrument delivery head 10 to a convenient position near the patient (not shown) during the dental procedure and then to move the instrument delivery head 10 out of the way to allow the patient to exit the dental chair (not shown) when the dental procedure is finished. The instrument delivery head 10 includes a manual lock release (not shown) located on an underside of each handle 14 that permits the user to unlock the delivery arm (not shown) through actuation of either lock release (not shown) so that the instrument delivery head 10 can be moved downward on the arm. When both lock releases are released, i.e., both lock releases are not actuated by the user, the delivery arm (not shown) locks the instrument delivery head 10 at its set height so that the instrument delivery head 10 will not go down.

Further referring to FIGS. 1–3, instrument delivery head 10 includes an instrument head base 16 that supports multiple valves and fittings 18 (FIG. 3) and tubing (not shown) required for operation of the hand-held instruments (not shown). A pair of instrument holders 20 are mounted to the base 16 and include multiple handpiece stations 22 for releasably holding the hand-held instruments used during the dental procedure. These instruments may include water and air syringes and various hand-held drill and polishing instruments that are conventionally used by a dental technician or dentist during a dental procedure.

In accordance with the principles of the present invention, an instrument head lid 24 is mounted to the base 16 through a pair of concealed hinges 26 (FIG. 3) so that the lid 24 is movable between a closed position (FIG. 1) and open positions (FIGS. 2 and 3) as described in detail below. It will be appreciated by those skilled in the art that mechanical structures other than hinges 26 are possible for mounting the lid 24 to the base 26 so that the lid 24 is free to move between the closed and open positions without departing from the spirit and scope of the present invention. For example, while the exemplary hinges 26 provide a hinged connection of the lid 24 to the base 16, it will be appreciated that other mechanical structures, such as linkages by way of example, are possible as well for operatively connecting the lid 24 to the base 16 so that the lid 24 is free to move relative to the base 16 between closed and open positions in a wide range of motions.

As shown in FIGS. 1 and 2, lid 24 has a depression or recess 28 formed on an outer surface thereof for receiving or engaging an anti-skid pad 30. The pad 30 engages the depression or recess 28 to prevent the pad 30 from sliding or otherwise moving relative to the lid 24. The pad 30 is made from a material, such as silicone or other material by way of example, that provides a frictional or anti-skid contact with an instrument tray or other instruments (not shown) supported on the pad 30. The pad 30 may be recessed, such as at 31 as shown in FIGS. 1 and 2, to support instruments (not shown) within the recess 31 of the pad 30.

As shown in FIGS. 2 and 3, a lid cover 32 is mounted to the lid 24 and has a face that supports multiple sets of handpiece controls 34 that permit a user to adjust operation of each instrument (not shown) when the lid 24 is opened. As will be described in detail below, the user is able to close the lid 24 after the control adjustments have been made. For example, the controls 34 may adjust coolant water volume, coolant air volume, drive air volume and other operating parameters for each hand-held instrument as understood by those of ordinary skill in the art. The controls 34 are formed as knobs 36 that are easily manipulated by a user without the need for special tools. Colors and graphics are used to identify functions of the controls 34. While the controls 34 are shown and described herein as being supported by the lid 24, it will be understood that the controls 34 could be supported by the instrument base 16 without departing from the spirit and scope of the present invention.

Figure 4:
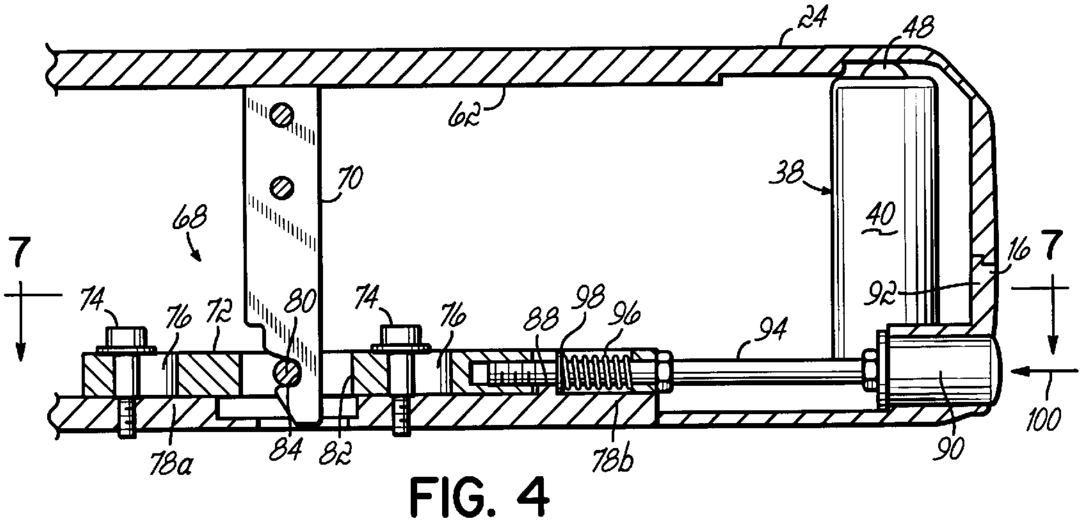
FIG. 4 is an enlarged partial cross-sectional view illustrating a latch mechanism incorporated in the instrument delivery head of FIG. 1 to releasably retain the lid in the closed position.
Figure 5:
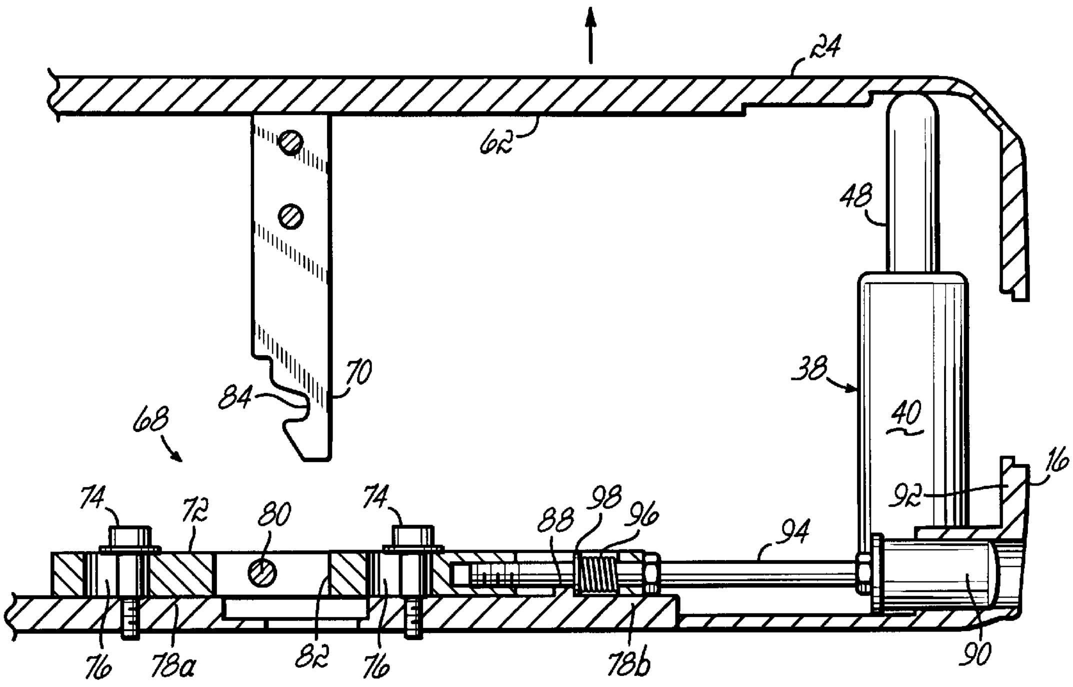
FIG. 5 is a view similar to FIG. 4 illustrating the latch mechanism in an actuated state to release the lid for movement toward the open position.
Figure 6:
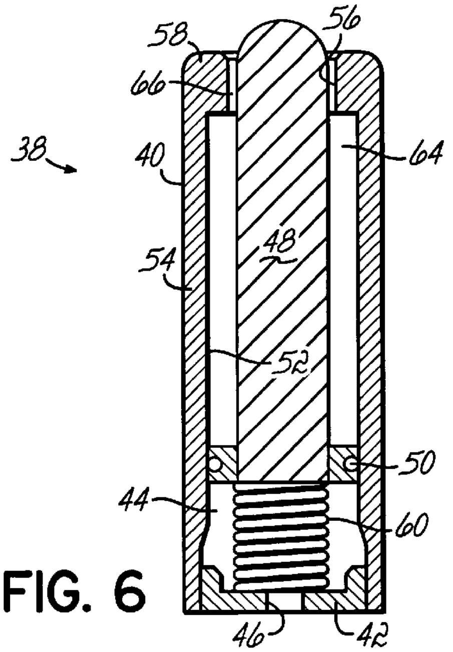
FIG. 6 is an enlarged side elevational view illustrating a lift mechanism incorporated in the instrument delivery head of FIG. 1 to bias the lid toward the open position.

Referring now to FIGS. 3–6, movement of the lid 24 to the open position is accomplished through a pair of lift mechanisms 38 that are mounted to the base 16 and that operatively engage the lid 24 as shown in FIGS. 4 and 5. As shown in FIG. 6, each lift mechanism 38 includes a lift housing 40 and a lift cap 42 mounted to one end of the lift housing 40 that, in combination, define a generally cylindrical cavity 44 within each lift mechanism 38. Each lift cap 42 includes a threaded aperture 46 for receiving a fastener (not shown) to secure the lift mechanisms 38 to the base 16.

Further referring to FIG. 6, an elongated lift body 48 is mounted within each lift housing 40 and carries an O-ring 50 about its circumference adjacent an inner end thereof that engages an inner surface 52 of lift housing side wall 54.

Each lift body 48 is mounted to extend and retract relative to its respective lift housing 40 through a bore 56 formed in a top wall 58 of each lift housing 40. Each lift body 48 is biased for extension relative to its respective lift housing 40 through a compression spring 60 mounted between the lift cap 42 and the inner end of the lift body 48.

As shown in FIGS. 4 and 5, a free end of each lift body 48 operatively engages an inner surface 62 of the lid 24. During extension of each lift body 48, a damping effect is created by an air cavity 64 (FIG. 6) defined between the O-ring 50 and the top wall 58 of each lift housing 40. As each lift body 48 extends relative to its respective lift housing 40, the O-ring 50 moves toward the top wall 58 to vent air from the air cavity 64 through an annular region 66 formed between the bore 56 and the lift body 48. It will be appreciated by those of ordinary skill in the art that the rate at which each lift body 48 extends relative to its respective lift housing 40 is determined by several parameters, including the spring constant of the spring 60, the size of the air cavity 64, and the size of the annular region 66. These parameters are selected so that the lift bodies 48 extend to raise the lid 24 in a controlled manner without abruptly moving the lid 24 or jarring anything supported on top of the lid 24. While lift mechanisms 38 are shown and described herein for moving the lid 24 to the open position, it will be appreciated that other structures, such as pneumatic or hydraulic lifts, springs or other mechanical or electro-mechanical structures capable of moving the lid 24 to the open position by way of example, are possible as well without departing from the spirit and scope of the present invention. In addition, while the lift mechanisms 38 are shown and described herein as being supported by the base 16 and operatively engaging the lid 24, it will be understood that the lift mechanisms 38 could be supported by the lid 24 and operatively engage the base 16 without departing from the spirit and scope of the present invention.

Figure 7:
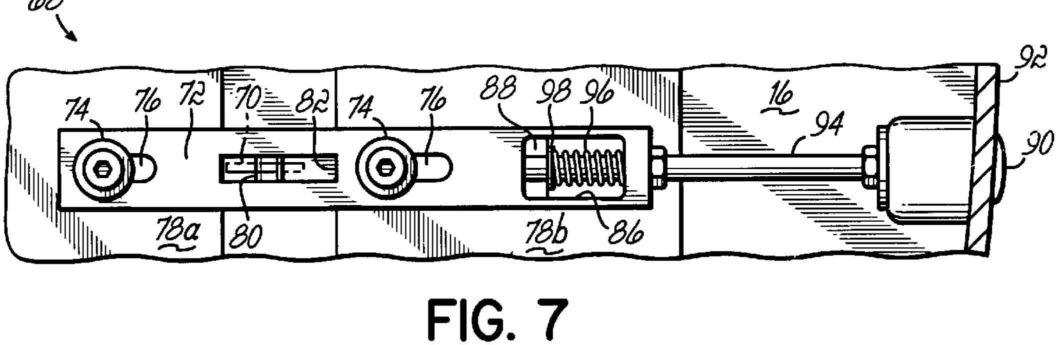
FIG. 7 is a cross-sectional view taken along line 7—7 of FIG. 4.

Referring now to FIGS. 4, 5 and 7, a releasable latch mechanism 68 is provided to retain the lid 24 in the closed position against the bias of the lift mechanisms 38. The latch mechanism 68 includes a latch 70 mounted to the lid 24 and a slidable latch release 72 mounted to the base 16 through fasteners 74 extending through elongated slots 76 formed in the latch release 72. The latch release 72 is slidably mounted on raised supports **78*a* and 78*b* formed in the base 16. The latch release 72 has a transverse latch pin 80 mounted in an elongated slot 82 that is adapted to releasably engage a notch 84 formed on the latch 70 when the lid 24 is moved to the closed position as shown in FIG. 4. The latch release 72 has an elongated slot 86 adapted to receive a yoke 88 projecting from the support 78*b*. A button actuator 90 is supported on one side wall 92 of the base 16 and is connected to the latch release 72 through an elongated latch rod 94. A compression spring 96 and washer 98 are mounted about the latch rod 94 and within the elongated slot 86 to bias the latch release 72 into engagement with the latch 70 to retain the lid 24 in the closed position as shown in FIG. 4**.

To open the lid 24, the button actuator 90 is manually actuated in the direction of arrow 100 (FIG. 4) to cause the latch release 72 to slide on the raised supports **78*a* and 78*b* and release engagement of the latch pin 80 with the notch 84 as shown in FIG. 5, thereby permitting the lift mechanisms 38 to open the lid 24 to the open position. Actuation of the button actuator 90 in the direction of arrow 100 compresses spring 96 as shown in FIG. 5 so that when the button 90 is released, the latch release 72 will return to its original position as shown in FIGS. 4 and 7 to engage the latch 70 when the lid 24 is closed. The lid 24 is closed by pushing down on the lid 24 to retract the lift bodies 48 against the bias of compression springs 60 until the latch 70 engages the latch release 72**.

As shown in FIG. 3, the lid 24 may be opened beyond the open position shown in FIG. 2 to provide access for maintenance within the instrument delivery head 10. A lid support arm 102 (FIG. 3) is pivotally mounted at one end to the lid 24 and has a free end that can be moved into engagement with base 16 to hold the lid 24 in the open position.

The instrument delivery head 10 of the present invention provides many benefits. The handpiece controls 34 are supported within the instrument delivery head 10 when the lid 24 is closed so they will require less cleaning than that required for externally mounted controls. The lid 24 is easily opened to permit access to the controls 34 through actuation of the latch release 72. After the control adjustments are made, the lid 24 is closed to conceal the controls 34 within the instrument delivery head 10. The lid 24 is connected to the base 16 so it does not need to be removed and stored when access to the controls 34 is required. The controls 34 are easily accessible when the lid 24 is opened and trays and other items supported on top of the lid 24 do not need to be first removed before the lid 24 is opened. In addition, the controls 34 cannot be accidently bumped or readjusted during the dental procedure and are designed so that no special tools are required to make adjustments.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicants' general inventive concept.

Having described the invention, we claim:

1. An instrument delivery head operable to support a plurality of hand-held instruments, comprising:
   - an instrument head base;
   - an instrument holder supported by said base and operable to support the plurality of instruments;
   - an instrument head lid mounted for movement relative to said base between open and closed positions;
   - a plurality of instrument controls supported by one of said base and said lid and operable to adjust operation of the instruments; and
   - a lift mechanism operable to bias said lid toward said open position to permit user access to said controls.

2. The instrument delivery head of claim 1 further comprising a releasable latch mechanism operable to retain said lid in said closed position against the bias of said lift mechanism.

3. The instrument delivery head of claim 2 wherein said releasable latch mechanism comprises a latch supported by one of said base and said lid and a movable latch release supported by said other.

4. The instrument delivery head of claim 1 wherein said lift mechanism comprises a lift housing supported by one of said base and said lid and a lift body mounted for extension and retraction relative to said lift housing and operable to engage said other.

5. The instrument delivery head of claim 4 wherein said lift body is biased for extension relative to said lift housing.

6. The instrument delivery head of claim 5 further comprising an O-ring disposed about a circumference of said lift body and engaging an inner surface of said lift housing.

7. The instrument delivery head of claim 1 wherein said lid is hingedly mounted to said base.

8. The instrument delivery head of claim 1 wherein said controls are supported by said lid.

9. The instrument delivery head of claim 1 wherein said lift mechanism is supported by said base and operatively engages said lid.

10. An instrument delivery head operable to support a plurality of hand-held instruments, comprising:

an instrument head base;

an instrument holder supported by said base and operable to support the plurality of instruments;

an instrument head lid mounted for movement relative to said base between open and closed positions;

a plurality of instrument controls supported by one of said base and said lid and operable to adjust operation of the instruments;

a lift mechanism operatively engaging said base and said lid and operable to bias said lid toward said open position to permit user access to said controls in said open position;

a releasable latch mechanism operatively engaging said base and said lid and operable to retain said lid in said closed position against the bias of said lift mechanism; and an actuator operatively connected to said latch mechanism end operable to release said latch mechanism to permit said lid to move to said open position under the bias of said lift mechanism.

11. The instrument delivery head of claim 10 wherein said lift mechanism comprises a lift housing supported by one of said base and said lid and a lift body mounted for extension and retraction relative to said lift housing and operable to engage said other.

12. The instrument delivery head of claim 10 wherein said releasable latch mechanism comprises a latch supported by one of said base and said lid and a movable latch release supported by said other.

13. The instrument delivery head of claim 10 wherein said lid is hingedly mounted to said base.

14. The instrument delivery head of claim 10 wherein said controls are supported by said lid.

15. An instrument delivery heed operable to support a plurality of hand-held instruments, comprising:

an instrument head base;

an instrument holder supported by said base and operable to support the plurality of instruments;

an instrument head lid mounted to said base for movement relative to said base between open and closed positions;

a recess formed in said lid; and an anti-slip pad supported by said lid and engaging said recess to prevent movement of said pad relative to said lid.

* * * * *